United States Patent [19]

Nilssen

[11] E Patent Number: Re. 31,848

[45] Reissued Date of Patent: Mar. 12, 1985

[54] ELECTRONIC ASSEMBLY

[76] Inventor: Ole K. Nilssen, Caesar Dr., R.R. 5, Barrington, Ill. 60010

[21] Appl. No.: 360,228

[22] Filed: Mar. 22, 1982

Related U.S. Patent Documents

Reissue of:

[64] Patent No.: 4,259,618
Issued: Mar. 31, 1981
Appl. No.: 937,452
Filed: Aug. 28, 1978

[51] Int. Cl.[3] ..... H05B 37/02; H05B 37/04; H05B 41/36

[52] U.S. Cl. ..... 315/360; 307/140; 315/119; 315/120

[58] Field of Search ..... 315/360, 119, 120; 307/140, 141

[56] References Cited

U.S. PATENT DOCUMENTS

| | | | |
|---|---|---|---|
| 3,889,132 | 6/1975 | Vreeland | 315/360 |
| 3,949,241 | 4/1976 | Maute | 315/360 |
| 3,979,601 | 9/1976 | Franklin | 307/141 |
| 4,002,925 | 1/1977 | Monahan | 315/360 |
| 4,104,541 | 8/1978 | Jewell | 307/141 |
| 4,338,562 | 7/1982 | Terwilliger | 307/141 |
| 4,360,739 | 11/1982 | Goldstein | 315/360 |

*Primary Examiner*—Saxfield Chatmon

[57] ABSTRACT

A compact electronic assembly operable to control the energization of an electrical appliance is adapted for convenient mounting in an existing, standard electrical wall-switch box. A disconnectable electronic control means is mounted on the outside of the switch face plate and communicates with circuitry inside the wall-switch box by means of a plug-in connection through the aperture of the switch face plate. According to one aspect of the invention, a programmable electronic timer-switcher comprises a mounting plate which is secured to the opening of the wall switch box. A multiple-conductor receptacle is secured to the mounting plate, which also preferably serves as a heat sink for a switching means such as a triac. The receptacle is aligned behind the rectangular aperture of a standard switch face plate to permit plug-in connection to a programmable electronic timer disposed exteriorly of the face plate. The switching means and the timer cooperate to effect controlled energization of the electrical light or appliance. According to other aspects of the present invention, appliance timer-switches are adapted for engagement with standard electrical outlets and connection to electrical appliance cords.

26 Claims, 8 Drawing Figures

FIG. 1
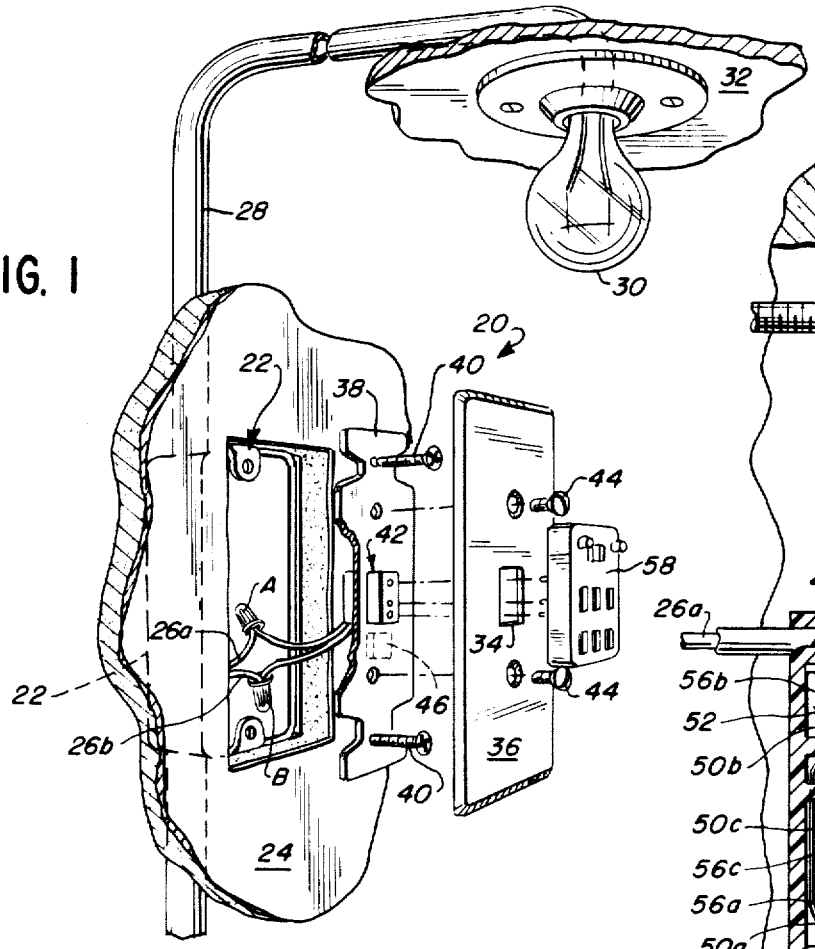
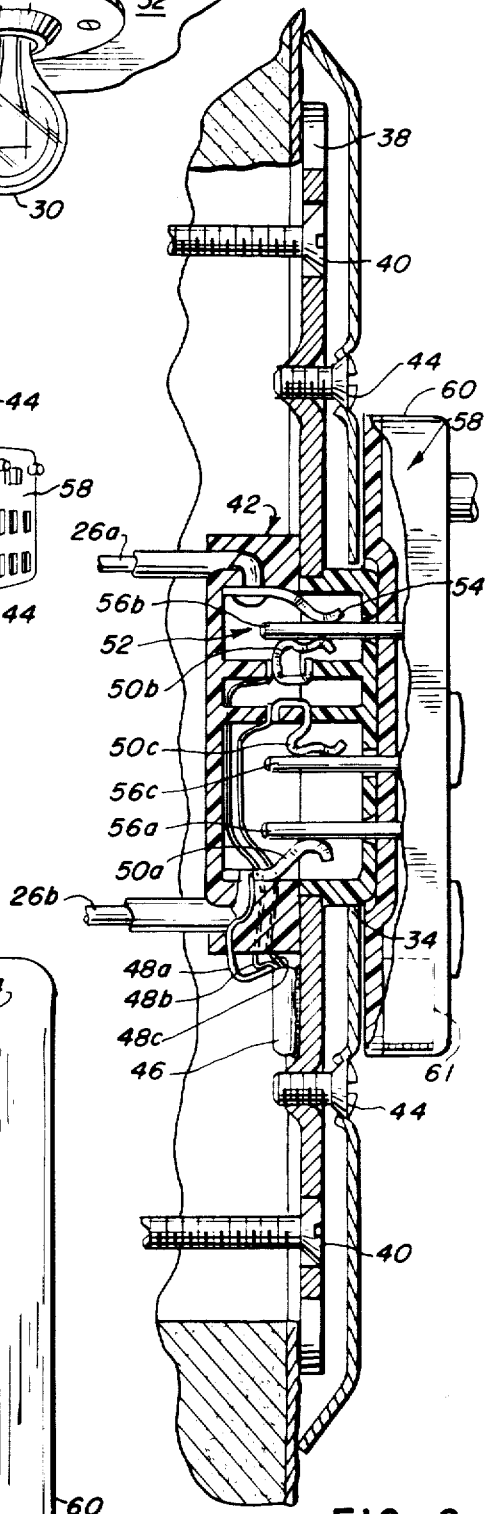
FIG. 2
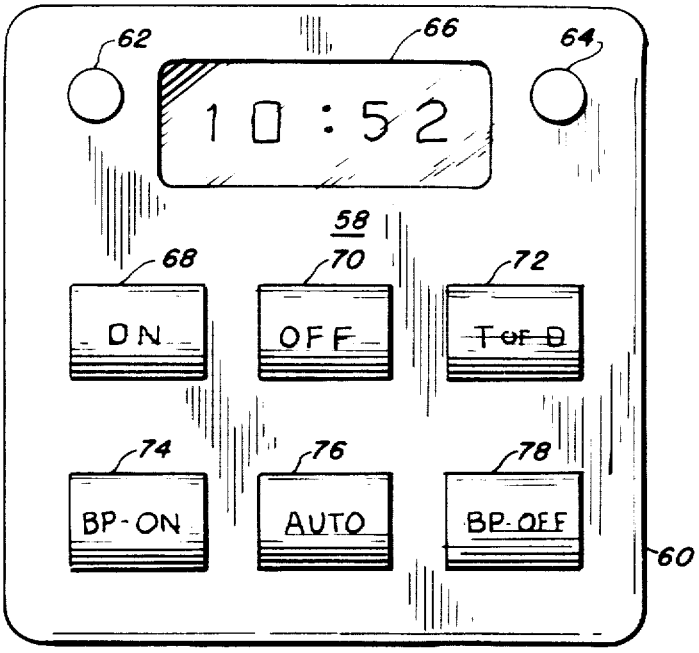
FIG. 3

FIG. 4
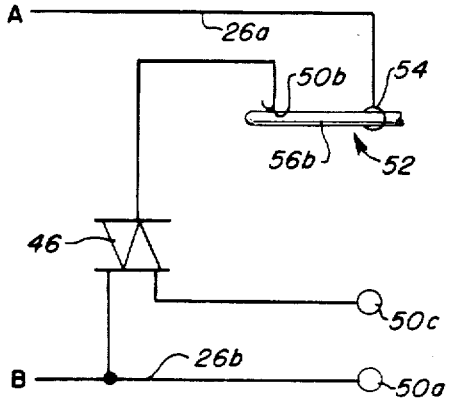
FIG. 5
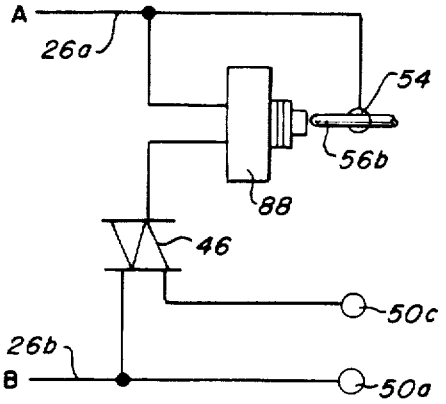
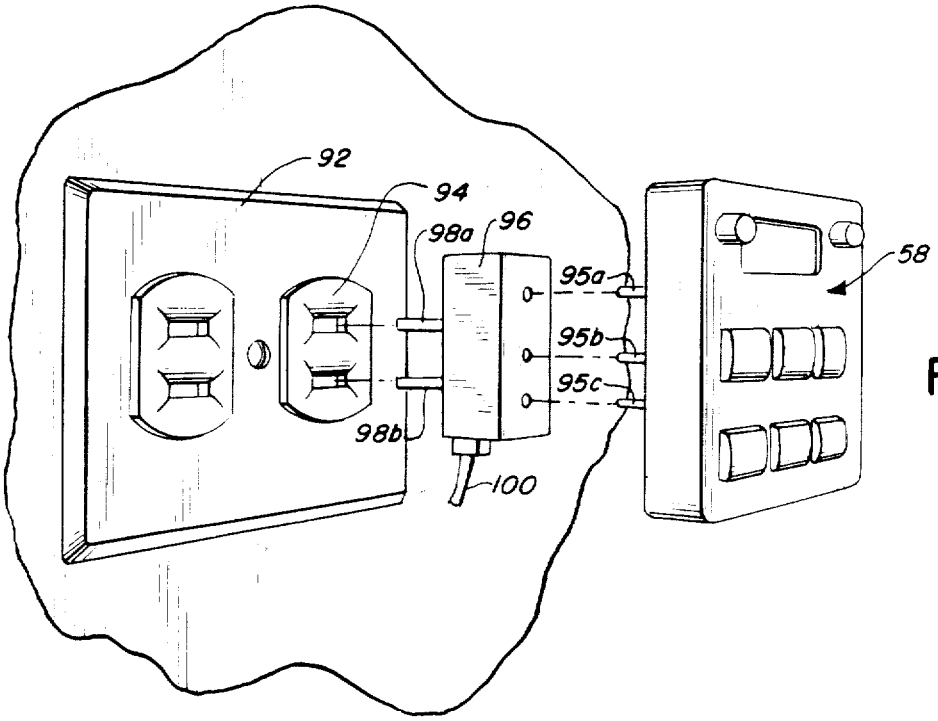
FIG. 7
FIG. 6
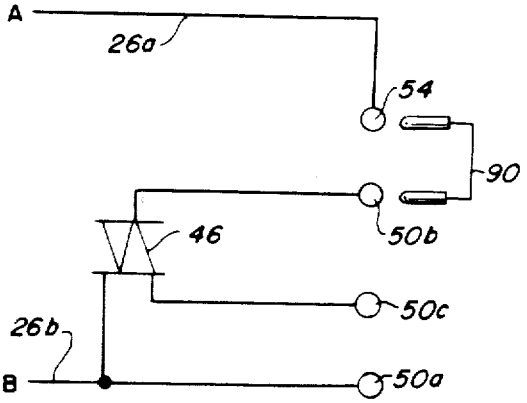
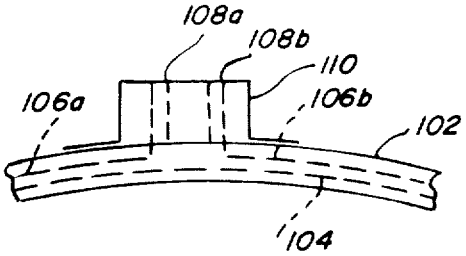
FIG. 8

ELECTRONIC ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to electrical and electronic devices suitable for controlling electrical lighting or appliances.

2. Description of Prior Art

Various types of electronic and electrical timing and switching devices have been provided for pre-set control of electrical lights, appliances and machinery in home and industrial applications. For example, a timer-switcher, which is particularly useful for a homeowner, is operable to control the turn-on and turn-off times of indoor lighting to create the impression that a home is occupied when in fact it may not be, in order to discourage would-be burglars or vandals. However, such prior known electronic devices are not readily adaptable for compact and convenient mounting in standard electrical wall-switch boxes. Most currently available timer-switchers are relatively large electro-mechanical devices; the only known wall-switch-mountable electronic timer-switcher cannot be used with standard wall face plates.

SUMMARY OF THE INVENTION

In general, the present invention is a compact electronic appliance control assembly which is adapted for convenient mounting in an existing, standard electrical wall-switch box. A disconnectable, plug-in electronic control means is mounted on the outside of the standard switch face plate and communicates with circuitry inside the wall-switch box by means of a plug and receptacle connection through the aperture of the switch face plate. Thus, there is no need for a special wall face plate.

According to one aspect of the present invention, a compact, low-cost electronic timer-switcher assembly is easily mounted in an existing, conventional wall-switch box for connection to the single switched leg or side of the power line usually present in the box. The timer-switcher utilizes the standard rectangular opening of the existing wall-switch cover of face plate for a plug-in type connector between the internal electrical light or appliance circuit and an external programmable electronic timer. More specifically, this timer-switcher assembly preferably comprises a keyed receptacle secured to a combination mounting plate and heat sink which fits over the opening of the standard wall-switch box. An electronic switching device, such as a triac, is connected to the receptacle and is mounted in thermal contact with the heat sink mounting plate internally of the wall-box. The receptacle is aligned in position with the rectangular aperture in the standard wall-switch cover plate and a disconnectable, plug-in programmable elecctronic timer module, disposed exteriorly of the face plate, has a multiple-conductor plug insertable through the aperture for engagement with the receptacle. For safety, an interlock disconnect is provided to mechanically disconnect the power from the load when the electronic timer unit is unplugged from the receptacle. The progammable timer module is provided with the usual time of day, turn-on and turn-off controls, as well as a bypass control to override the automatic control function to permit normal switching operation. Since the mounting plate, switching means and keyed receptacle are compact enough to fit within even the smallest standard wall-switch box, the use of a custom wall plate for covering the box is not requiired.

According to other aspects of the present invention, compact electronic timer-switcher assemblies are readily adapted for plug-in connection to standard electrical wall receptacles and for attachment to electrical appliance supply cords.

It is a primary object of the present invention to provide an *improved* electronic appliance control assembly for convenient installation within an existing, standard electrical wall-switch box.

Another object of the present invention is to provide an external, disconnectable electronic control means mounted on the outside of the existing switch face plate for communication with internal appliance circuitry by means of a plug-in connection through the aperture of the face plate, thereby obviating the necessity of providing a special wall plate.

Still another important object of the present invention to provide a low-cost, compact electronic timer-switcher assembly which is conveniently and readily mounted in a conventional wall-switch box for controlling an associated light or other electrical appliance.

A further object of this invention is to provide an *improved* electronic timer-switcher having interlock disconnect means for mechanically disconnecting the power from the load when the electronic timer module is unplugged.

It is another object of this invention to provide a universal electronic timer-switcher assembly which has a timer module that can be mounted not only at a wall switch-box but also, with minor modifications and [th] *the* use of adapters, to an electrical appliance cord or an outlet receptacle.

The means by which the foregoing and other objects of the present invention are accomplished and the manner of their accomplishment will be readily understood from the following specification with reference to the accompanying drawings, which, taken together, disclose preferred embodiments of the present invention.

BRIEF DESCRIPTION OF THE DRAWINGS

FIG. 1 is an exploded perspective view of an electronic assembly according to the present invention illustrated as an electronic timer-switcher mounted in a standard wall-switch box for control of an associated ceiling light;

FIG. 2 is an enlarged side view of the timer module shown in FIG. 1;

FIG. 3 is a front elevation of the plug-in timer module illustrated in FIG. 2;

FIG. 4 is a partial schematic circuit diagram of the timer-switcher assembly showing a triac switching means and a sliding bar type of mechanical disconnect;

FIG. 5 is a similar schematic diagram illustrating a switch type of disconnect;

FIG. 6 is another schematic circuit diagram showing a switch or jumper disconnect;

FIG. 7 is an exploded perspective of an alternate form of the timer-switcher according to the present invention for use with a conventional wall receptacle; and FIG. 8 is a side elevation of an appliance cord adapter for use with a timer-switcher for automatically controlled energization of an appliance.

DESCRIPTION OF THE PREFERRED EMBODIMENTS

With reference to the drawings, FIGS. 1–3 illustrate a preferred embodiment of an electronic assembly according to the present invention comprising a timer-switcher assembly 20 for control of a ceiling light. It is important to note that an electronic assembly of the present invention is not restricted to application to the illustrated timer-switcher; another common example is a light dimmer control. The present invention provides mounting of any compact applicance control electronic device within a wall-switch box wherein the device is manually controlled or set from the outside and the existing wall-switch face plate is utilized.

As shown in FIG. 1, a standard wall-box 22, such as is typically used for common mechanical light switches, is mounted in a wall 24. Electrical wiring comprising one leg of a lighting circuit is shown having leads 26a and 26b, which are wired through a conduit 28 to a light 30 mounted on a ceiling 32. Of course, this timer-switcher may be used to control the energization of various other types of electrical devices.

As will be described in detail, the timer-switcher assembly 20 is shown as comprising two main components, an appliance or light circuit switching means preferably mounted internally of wall-box 22 and a disconnectable, plug-in electronic control or timer means mounted exteriorly thereof and electrically connected with the switching means through a connector disposed within a standard rectangular opening or aperture 34 in an existing, conventional wall-switch cover or face plate 36. With additional reference to FIG. 2, a combination mounting plate and heat sink 38 is secured by means of conventional fasteners 40 to overlie the opening of wall-switch box 22. A keyed receptacle 42 is securely mounted to and positioned on the mounting plate 38 so as to be in alignment with the opening 34 of the cover plate 36 when the latter is mounted to cover the wall-switch box 22 by means of conventional screw fasteners 44 which engage the mounting plate 38. An electronic switching device, in the form of a triac 46 in the preferred embodiment, is securely mounted in thermal contact with, and on the rear of, heat sink 38 and internally of the wall-switch box 22. Triac 46 is wired through leads 48a, 48b and 48c to respective terminals 50a, 50b and 50c within receptacle 42. The mounting plate 38 is approximately sized so as to provide the requisite heat-sink function for triac 46.

An interlock disconnect, depicted generally by reference numeral 52, is formed within receptacle 42. With additional reference to FIG. 4, the interlock may comprise a simple sliding bar device having a terminal 50b, a terminal 54 (for lead 26a) and a pin 56b extending rearwardly from a programmable electronic timer module 58; terminals 50b and 54 are mechanically and electrically separated when pin 56b is disengaged therewith when the electronic timer module is unplugged. In FIG. 4, which is a partial schematic diagram illustrating the connections of the triac 46 to the lighting circuit comprising leads 26a and 26b, the reference letters A and B identify the connections within the wall-switch box 22 in FIG. 1. The interlock disconnect 52 is provided to both mechanically and electrically disconnect the load when the timer module is unplugged; the interlock disconnect physically breaks the load connections for safety reasons upon timer module removal.

The timer-module 58, which is best seen in FIG. 2, comprises a housing 60 from the rear of which extend terminal plug pins 56a, 56b and 56c. These terminal pins are connected to a programmable electronic timer circuit assembly having a built-in clock feature, the details of which form no part of the present invention. Where the switching device or triac 46 is operable to interrupt only one side or leg of the power line to the light 30, the timer module 58 is conveniently powered from a battery 61 located at the [rate] *rear* of module 58. For safety reasons, the battery 61 is accessible only from the rear of module 58 when the latter is unplugged; when this occurs, the interlock 52 serves to mechanically disconnect the load from the power source.

It should also be recognized that the triac 46 may be contained within the housing 60 of the module 58; of course, this arrangement (not shown) will limit the switching capability of the triac 46 because of reduced heat dissipation capability of the module 58.

Appropriate controls for programming the timer circuit module 58 are mounted on the front of housing 60 and include an hour roll key 62, a minute roll key 64, a four-digit hour and minute read-out display 66, a time-to-turn-on key 68, a time-to-turn-off key 70, a time-of-day key 72, an on bypass key 74, an automatic timing mode key 76 and an off bypass key 78. It is to be understood that the various pushbutton keys noted above can be electrically insulated within housing 60 from the various power line connections through use of well known plastic sheeting of other insulating materials.

The terminal pins 56a, 56b and 56c extending rearwardly from the plug-in timer 58 are keyed, with pin 56c being closer to pin 56a than to 56b, in order to insure proper electrical connections between these pins and their corresponding contacts in the receptacle 42.

FIGS. 5 and 6 schematically illustrate alternate forms of interlock disconnects. FIG. 5 shows a normally open push-switch 88 mounted internally of receptacle 42, the actuating arm of switch 88 being operationally engaged by pin 56b. In the FIG. 6 arrangement, a mechanical jumper or switch, schematically illustrated at 90, is formed in the module 58; when module 58 is unplugged, a jumper 90 secured to module 58 automatically disconnects the triac 46 in a manner similar to that previously described.

FIG. 7 illustrates a programmable timer-switcher according to another aspect of the present invention adapted for plug-in connection to a conventional outlet receptacle 92 having a socket 94. The plug-in programmable electronic module 58, which is preferably identical in construction to that previously described, comprises keyed pins 95a, 95b and 95c which engage corresponding sockets of an adapter 96 having rearwardly extending pins 98a and 98b which, in turn, plug into the outlet socket 94. The adapter 96 comprises a triac switching means similar to that previously described. The appliance to be controlled is connected to adapter 96 through a line cord 100 plugged into the adapter.

Alternatively, the triac 46 may be contained within the interior of the timer module [59.] *58.* In this arrangement, the appliance to be controlled is connected to the module 58 instead of to the adapter 96 and the module 58 is adapted to plug directly into the wall receptacle.

FIG. 8 illustrates yet another form of the present invention adapted for connection to an appliance line cord 102 comprising a lead 104 and a broken lead having sections 106a and 106b which are, in turn, connected to receptacle sockets or conductors 108a, 108b, respectively, of a cord adapter 110. In this arrangement, sockets 108a and 108b are designed to receive corresponding pins of a two-prong plug of a programmable electronic timer module (not shown) similar to the timer module 58 previously described, with the exception that the two-prong module comprises an internal triac for switching the leads 106a and 106b of the line cord 102. Alternatively, as will be readily apparent to those skilled in the art, the triac may be contained within the adapter 110, in which case a third receptacle socket or conductor, similar to 108a and 108b, will be required to permit plug-in connection to a three pin programmable electronic module identical to that disclosed in FIG. 7. The cord adapter preferably contains a shorting feature comprising a spring connector (not shown) between the receptacle sockets or conductors 108a and 108b for shorting them together upon removal of the timer means module from the adapter 110.

With regard to the overall operation of the various timer-switcher assemblies of the present invention, through proper programming of the various controls on a module 58, an appropriate appliance energization time-control program can be pre-set. For example, with the control arrangement of the module 58 illustrated in FIG. 3, to set a "turn-on" time, it is only necessary to press the time-to-turn-on key 68 while at the same time operating one of the time-roll keys 62, 64. Thus, by pressing the time-to-turn-on key 68 [whith] *with* the hour-roll key 62, one can set the hour of the turn-on time; by pressing the time-to-turn-on key 68 with the minute-roll key 64, one can set the minute of the turn-on time. To program the time-to-turn-off or time-of-day timer, a similar procedure is followed with keys 70, 72, respectively. After the desired programming has been performed, the automatic timing mode of module 58 is initiated by pressing the automatic timing mode key 76. If, for some reason, it is desirable to override the automatic operation, it is only necessary to press either the on bypass key [72] *74* or the off bypass key 78. Any time thereafter, if the automatic timing mode key 76 is pressed, the timer module 58 will revert to its automatic mode and resume its automatic switching cycle. Otherwise, the timer module 58 can be used as a simple on-off switch via keys 74, 78.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

The embodiments of the invention in which an exclusive property or privilege is claimed are defined as follows:

1. An electronic assembly operable to control the switching of a single leg of an electrical load circuit connected to a power source and adapted for mounting at a standard electrical wall-switch box having a face plate with a single central aperture therein, said assembly comprising:

electrically actuatable load circuit switching means disposed within the wall-switch box, a multiple-conductor receptacle being connected to the load switching means and mounted in alignment with the aperture of the face plate and a plug-in programming means adapted for placement exteriorly of the face plate and having a multiple-conductor plug insertable through the aperture to engage the receptacle;

whereby said programming means operates said circuit switching means for controlled energization of the electrical load.

2. The electronic assembly of claim 1 and disconnect means for mechanically and electrically disconnecting the load from the power source upon removal of said plug from said receptacle.

3. A programmable electronic timer-switcher operable to control the switching of a single leg of an electrical load circuit connected to a power source and adapted for mounting at a standard electrical wall-switch box having a face plate with a single central aperture therein, said timer-switcher comprising:

semiconductor load switching means located within the wall-switch box, a multiple-conductor receptacle being connected to the switching means and mounted in alignment with the aperture of the face plate and a plug-in programmable electronic timer means adapted for placement exteriorly of the face plate and having a multiple-conductor plug insertable through the aperture to engage with the receptacle;

whereby said switching means is controlled by said electronic timer means to effect energization and de-energization of the electrical load in accordance with a preset program.

4. The timer-switcher of claim 3 and a mounting plate comprising a heat sink and being secured to the opening of the wall-switch box, and wherein said switching means is mounted on said mounting plate in thermal contact therewith.

5. The timer-switcher of claim 3 wherein the switching means and the timer means are powered from the single leg of the electrical load circuit.

6. The timer-switcher of claim 4 and disconnect means for mechanically and electrically disconnecting the load from the power source upon removal of said plug of said timer means from said receptacle.

7. The timer-switcher of claim 3 wherein said timer means comprises a battery for energization thereof.

8. The timer-switcher of claim 6 wherein said battery is located at the rear of said timer means to be accessible only when said timer means is unplugged from said receptacle.

9. A programmable electronic timer-switcher operable to control the switching of a single leg of an electrical load circuit and adapted for plug-in connection to a standard electrical outlet receptacle, said timer-switcher comprising:

programmable electrical timer means having a plug;

plug-in adapter means having a plug insertable into the outlet receptacle and a receptacle for receiving said plug of said timer means; and switching means in circuit with the timer means and the load;

whereby said switching means is controlled by said electronic timer means to effect energization and de-energization of the electrical load in accordance with a preset program.

10. A programmable electronic timer-switcher operable to control the switching of a single leg of an electrical load circuit in an electrical supply cord, said timer-switcher comprising:

programmable electronic timer means having a multiple-conductor plug;

cord adapter means having a multiple-conductor receptacle for said plug and being in circuit with the load supply cord; and switching means in circuit with the timer means and the load;

whereby said switching means is controlled by said electronic timer means to effect energization and de-energization of the electrical load in accordance with a preset program.

11. The timer-switcher of claim 10 wherein said adapter means comprises a two-conductor receptacle in circuit with one wire of the load cord and shorting means for electrically connecting the receptacle conductors together upon removal of said timer means plug from said receptacle.

*12. An electronic wall-switch product adapted: (i) to be mounted at a standard electrical wall-switch box in lieu of an ordinary mechanical wall-switch, said wall-switch box having a pair of wires coming thereinto, (ii) to be used and mounted in combination with an ordinary wall-switch face plate having an aperture therein, and (iii) to be used for energizing an electrical load in accordance with a preset time program; said time program being controllably changeable in part and/or in its entirety; said product, after having been mounted at said wall-switch box, comprising:*

*mounting means fastened onto said wall-switch box;*

*electrically actuatable switching means mounted onto said mounting means, connected in circuit with said pair of wires, and operable to cause electrical connection and/or non-connection therebetween in response to electrical actuation signals; and*

*programmable electronic timer means connected in circuit with said switching means and operable to provide said actuation signals in accordance with said time program, said timer means having: (i) programming control means operative to accept manual programming instructions productive of changing part and/or all of said preset time program, and (ii) display means operative to provide visually discernible indication of the manual programming instructions having been accepted by said manual programming input means; said programming control means being manually accessible from the outside of said face plate said display means being visually discernible from the outside of said face plate;*

*whereby said wall-switch product is capable, by way of coupling means mounted in alignment with and coupling through said aperture, of being used with a standard wall-switch face plate having but a single aperture therein while also being capable of energizing said electrical load in accordance with said preset time program even though connected with but a single pair of wires.*

*13. The product of claim 12 and mechanical circuit breaking means operative to permit mechanical breaking of any electrical connection between said pair of conductor means, said mechanical circuit breaking means being manually actuatable from the outside of said face plate.*

*14. The product of claim 12 comprising energy storing means operative to permit said product to function independently of any voltage that might be present between said pair of wires.*

*15. The product of claim 12 wherein said display means comprises an electrically actuatable alpha-numeric display.*

*16. A product for installation at the location of a standard wall-switch box assembly within a home or other facility, said wall-switch box assembly normally comprising: (i) a wall-switch box having a pair of electrical wires coming thereinto, (ii) a manually actuatable switch supported by and located primarily within said box, and (iii) a removable face plate with an aperture therein for accepting the manually actuatable portion of said switch; said product comprising two parts, at least one of which includes electrical control signal producing means:*

*a first part adapted for support by and for mounting onto and primarily within the wall-switch box after said manually actuatable switch and face plate have been removed therefrom; said first part having: (i) a pair of electrical terminals adapted for connection with said wires; (ii) means to permit the mounting thereonto of said face plate; and (iii) power control means interposed between said terminals, said power control means having at least one control input terminal responsive to the electrical control signal produced by said control signal producing means; said control signal being determinative of the power applied to a load conditionally connected with said wires; and*

*a second part adapted for mounting outside the wall-switch box assembly and immediately adjacent the outer surface of the face plate after said first part has been mounted onto and primarily within said box and after the face plate has been replaced thereonto; said second part having manually manipulatable program control means and visual indicating means accessible and readable from the front of the face plate for establishing visually discernible on-off periods of manually determinable optionally different durations effective at manually determinable optionally different times; said program control means being coupled through the aperture of said face plate to said first part and in controlling relation to said control signal producing means for controlling the application of said control signal to said control input terminals, thereby to control said power control means in accordance with the on-off periods and times established by said program control means;*

*whereby said product is capable, by way of coupling means mounted in alignment with said aperture and operative to connect and couple between said first part and said second part through said aperture, of being used with a face plate having but a single aperture, while also being capable of controlling said power control means in accordance with the on-off periods and times established by said program control means even though connected with but a single pair of electrical wires.*

*17. A power control product adapted to plug into an ordinary electric power receptacle and operable to control the flow of power therefrom to a load, said product comprising:*

*plug means adapted for plug-in connection with said receptacle;*

*receptacle means operative to accept plug-in connection of said load;*

*power control means connected in circuit with said plug means and said receptacle means, and operable to control the flow of power to said load, said power control means comprising a programmable timer means and requiring for its proper operation a supply*

*of DC voltage that is independent of the presence of voltage at said electric receptacle; and*

*voltage supply means operable to supply said DC voltage.*

*18. The product of claim 17 wherein said voltage supply means comprises a battery.*

*19. A control module adapted for plug-in connection with a receptacle means being mounted at a wall switch box in alignment with an aperture of a cover plate therefore and, said receptacle means having two terminals connected in circuit with an electric load and a single leg of a power line, said module being operable to control the energization of said load in accordance with a preset time program and comprising:*

*plug means adapted for plug-in connection with said receptacle means, thereby providing connection with said terminals;*

*programmable control means connected in circuit with said plug means and operable to cause connection and/or disconnection between said terminals in accordance with said preset time program, said control means being receptive of programming instructions operative to establish and/or change any part of said time program; and*

*manual programming input means connected with said control means and operable to manually accept said programming instructions;*

*whereby said control module is capable of controlling the energization of said load without requiring any electrical connections external of the module other than to said two terminals.*

*20. The module of claim 19 including an energy source operative to permit said programmable control means to function irrespective of the presence of voltage on said power line.*

*21. An electronic wall-switch product adapted: (i) to be mounted at a standard wall-switch box in lieu of an ordinary mechanical wall-switch having two electrical connection terminals, said wall switch box having a cover plate with an aperture therein, and (ii) by means aligned with and protruding through said aperture to be used for controlling the flow of power to a load from an electric utility power line, said product comprising:* electrically actuatable load circuit switching means connectable with said power line and operable to control said flow of power in response to actuation signals;

*electronic control means connected in circuit with said switching means and operable to provide said actuation signals, said control means comprising programmable timer means and requiring for its proper operation a supply of DC voltage that is independent of any voltage present on said power line; and*

*voltage supply means operative to supply said DC voltage;*

*whereby said wall-switch product is capable of controlling the flow of power to said load even though being connected with but said two electrical connection terminals.*

*22. The product of claim 21 wherein said electronic control means is operative to provide said actuation signals in accordance with a time program.*

*23. An electronic assembly operable to control the switching of a single leg of an electrical load circuit connected to a power source and adapted for mounting at a standard electrical wall-switch box having a face plate with an aperture therein, said assembly comprising:*

*electrically actuatable load circuit switching means disposed within the wall-switch box;*

*a multiple-conductor receptacle being connected to the load switching means and mounted in alignment with the aperture of the face plate;*

*a plug-in programming means adapted for placement exteriorly of said face plate and having a multiple-conductor plug insertable through the aperture to engage the receptacle, whereby said programming means operates said circuit switching means for controlled energization of the electrical load; and*

*disconnect means actuatable from the outside of said face plate and operable to provide mechanical and electrical disconnection of the load from the power source.*

*24. An electronic wall-switch product adapted: (i) to be mounted at a standard electrical wall-switch box in lieu of an ordinary mechanical wall-switch, said wall-*switch box having a pair of wires coming thereinto, *(ii) to be used and mounted in combination with a standard face plate having an aperture, and (iii) to be used for energizing an electrical load in accordance with a preset time program; said product, after having been mounted at said wall-switch box, comprising:*

*a pair of conductor means connected with said pair of wires;*

*electrically actuatable load circuit switching means connected in circuit with said pair of conductor means and operable to cause electrical connection and/or non-connection therebetween in response to electrical actuation signals;*

*programmable electronic timer circuit means connected with said load circuit switching means and operable to provide said actuation signals thereto in accordance with said preset time program, said timer circuit means being receptive of programming instructions productive of changing all or any part of said preset time program;*

*programming control means operative to manually receive said programming instructions and to communicate these to said timer circuit means;*

*visual display means connected with said control means and operative to provide visual indication of the programming instructions being or having been received by said control means; and*

*mounting means operative to provide for mounting to said wall-switch box of said conductor means, said load circuit switching means, said timer circuit means, said programming control means, said visual display means, and said standard face plate; said mounting means being operative to dispose said standard face plate in a position between said conductor means and the combination of said programming control means and said visual display means, with said conductor means being located substantially within said wall-switch box and behind said face plate, and with said combination being located outside of said wall-switch box and in front of said face plate;*

*whereby said wall-switch product is capable, by way of coupling means mounted in alignment with said aperture and operative to couple therethrough, of being used with a standard face plate having but a single aperture, while also being capable of energizing an electrical load in accordance with a preset time program, yet being connected with but a single pair of wires.*

*25. The product of claim 24 and mechanical circuit breaking means operative to permit mechanical breaking of any electrical connection between said pair of conductor*

*means, said mechanical circuit breaking means being manually actuatable from the outside of said face plate.*

*26. A wall-switch product provided in at least two separate parts, said parts being adapted: (i) for coupling with one another in communicative and mechanical relationship by way of mutually compatible coupling means, (ii) for assembly and mounting at a standard electrical wall-switch box in lieu of an ordinary mechanical wall-switch, said wall-switch box having a pair of wires coming thereinto, (iii) for use and mounting in combination with a standard wall-switch face plate, said face plate having an aperture, (iv) for mounting one on each side of said face plate, with said coupling being accomplished by way of said aperture, and (v) when assembled and mounted at said wall-switch box, to energize and de-energize an electrical load in accordance with a preset program; said two parts being identified as a first part and a second part; said first part: (i) being adapted to be mounted onto and to be located substantially within said wall-switch box, (ii) having connect means adapted for connection with said pair of wires, and (iii) having fastening means by which said face plate can be fastened thereonto; said second part: (i) being adapted to be supported by and to couple with said first part after the face plate has been fastened thereonto, said coupling being accomplished by way of said coupling means which is aligned with and operative to couple through said aperture, and (ii) having program control and display means operative to permit the establishment and corresponding visual affirmation of said preset program;*

*whereby said wall-switch product is capable of being mounted and used with a face plate having but a single aperture, while at the same time being capable of energizing and de-energizing an electrical load in accordance with a preset program, yet being connected with but a single pair of wires.*

* * * * *

UNITED STATES PATENT AND TRADEMARK OFFICE

CERTIFICATE OF CORRECTION

PATENT NO. : Re 31848

DATED : March 12, 1985

INVENTOR(S) : Ole K. Nilssen

It is certified that error appears in the above-identified patent and that said Letters Patent is hereby corrected as shown below:

Claim 19, line 4, "and, said receptacle means having two terminals connected" should read -- and having two terminals connected.--

Signed and Sealed this

*Thirtieth* Day of *July 1985*

[SEAL]

*Attest:*

DONALD J. QUIGG

*Attesting Officer*

*Acting Commissioner of Patents and Trademarks*

UNITED STATES PATENT AND TRADEMARK OFFICE

CERTIFICATE OF CORRECTION

PATENT NO. : Re. 31,848

DATED : Mar. 12, 1985

INVENTOR(S) : Ole K. Nilssen

It is certified that error appears in the above-identified patent and that said Letters Patent is hereby corrected as shown below:

In column 7, line 56, insert the word --central-- in front of the word "aperture".

In column 8, line 50, insert the word --central-- in front of the word "aperture".

In column 10, line 62, insert the word --central-- in front of the word "aperture".

In column 12, line 14, insert the word --central-- in front of the word "aperture".

Signed and Sealed this

*Eighth* Day of *July 1986*

[SEAL]

*Attest:*

DONALD J. QUIGG

*Attesting Officer*

*Commissioner of Patents and Trademarks*

US001031848A

REEXAMINATION CERTIFICATE (2162nd)

United States Patent [19]

[11] B1 Re. 31,848

Nilssen

[45] Certificate Issued Dec. 28, 1993

[54] ELECTRONIC ASSEMBLY

[76] Inventor: Ole K. Nilssen, Caesar Dr., R.R. 5, Barrington, Ill. 60010

Reexamination Request:
No. 90/002,760, Jun. 16, 1992

Reexamination Certificate for:

| | |
|---|---|
| Patent No.: | **Re. 31,848** |
| Issued: | **Mar. 12, 1985** |
| Appl. No.: | **360,228** |
| Filed: | **Mar. 22, 1982** |

Related U.S. Patent Documents

Reissue of:

| | |
|---|---|
| [64] Patent No.: | **4,259,618** |
| Issued: | **Mar. 31, 1981** |
| Appl. No.: | **937,452** |
| Filed: | **Aug. 28, 1978** |

Certificate of Correction issued Jul. 13, 1985.

[51] Int. Cl.[5] ..... H05B 37/02

[52] U.S. Cl. ..... 315/360; 307/140; 315/119; 315/120

[58] Field of Search ..... 315/119, 120, 360, 86; 307/140, 141.4; 200/33 R, 35 R, 36, 38 R, 309.15, 309.2, 72, 73, 82, 83, 84, 244, 250, 251, 259, 200

[56] References Cited

U.S. PATENT DOCUMENTS

| | | | |
|---|---|---|---|
| 3,214,670 | 10/1965 | Schaf | 320/2 |
| 3,740,680 | 6/1973 | Schneidinger | 335/59 |
| 3,948,441 | 4/1976 | Perkins et al. | 236/46 R |
| 4,001,527 | 1/1977 | Hulshizer | 200/38 FB |
| 4,130,748 | 12/1978 | Schwer | 200/38 D |

OTHER PUBLICATIONS

Mezur "10 Function Digital Clock" Radio-Electronics vol. 48 No. 9 Sep. 1977.

*Primary Examiner*—Robert J. Pascal

[57] ABSTRACT

A compact electronic assembly operable to control the energization of an electrical appliance is adapted for convenient mounting in an existing, standard electrical wall-switch box. A disconnectable electronic control means is mounted on the outside of the switch face plate and communicates with circuitry inside the wall-switch box by means of a plug-in connection through the aperture of the switch face plate. According to one aspect of the invention, a programmable electronic timer-switcher comprises a mounting plate which is secured to the opening of the wall switch box. A multiple-conductor receptacle is secured to the mounting plate, which also preferably serves as a heat sink for a switching means such as a triac. The receptacle is aligned behind the rectangular aperture of a standard switch face plate to permit plug-in connection to a programmable electronic timer disposed exteriorly of the face plate. The switching means and the timer cooperate to effect controlled energization of the electrical light or appliance. According to other aspects of the present invention, appliance timer-switches are adapted for engagement with standard electrical outlets and connection to electrical applicance cords.

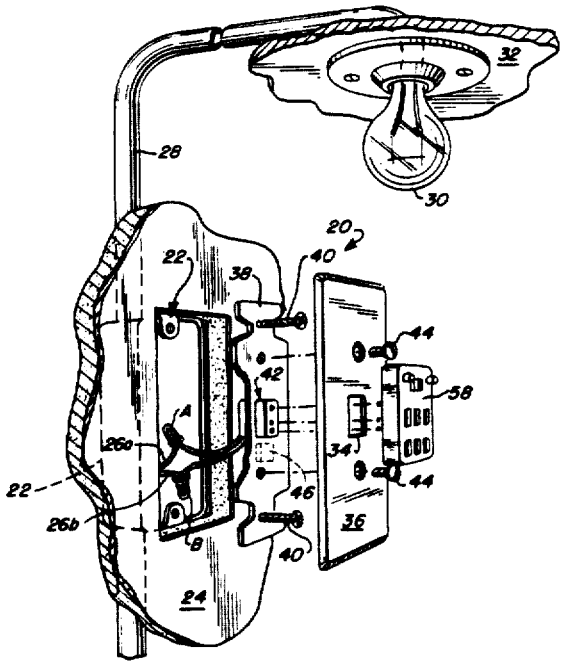

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8, 16 and 23 is confirmed.

Claims 9, 10, 12, 17, 21, 24 and 26 are determined to be patentable as amended.

Claims 11, 13-15, 18-20, 22 and 25, dependent on an amended claim, are determined to be patentable.

New claims 27-32 are added and determined to be patentable.

9. A programmable electronic timer-switcher operable to control the switching of a single leg of an electrical load circuit and adapted for plug-in connection to a standard outlet receptacle, said timer-switcher comprising:

programmable electrical timer means having a plug;

plug-in adapter means having a plug insertable into the outlet receptacle and a receptacle for receiving said plug of said timer means; and switching means *connected* in circuit with the timer means and the *electrical* load *circuit; the switching means including a semiconductor through which flows at least a part of any current flowing through the electrical load circuit;* whereby said switching means is controlled by said electronic timer means to effect energization and de-energization of the electrical load *circuit* in accordance with a preset time program.

10. A programmable electronic timer-switcher operable to control the switching of a single leg of an electrical load circuit in an electrical supply cord, said timer-switcher comprising:

programmable electronic timer means having a multiple-conductor plug;

cord adapter means having a multiple-conductor receptacle for said plug and being in circuit with the load supply cord; and switching means *connected* in circuit with the timer means and the *electrical* load *circuit; the switching means including a semiconductor through which flows at least a part of any current flowing through the electrical load circuit;* whereby said switching means is controlled by said electronic timer means to effect energization and de-energization of the electrical load in accordance with a preset program.

12. An electronic wall-switch product adapted: (i) to be mounted at a standard electrical wall-switch box in lieu of an ordinary mechanical wall-switch, said wall-switch box having a pair of wires coming thereinto, (ii) to be used and mounted in combination with an ordinary wall-switch face plate having a central aperture therein, and (iii) to be used for energizing an electrical load in accordance with a preset time program, said time program being controllably changeable in part and/or in its entirety; said product, after having been mounted at said wall-switch box, comprising:

mounting means fastened onto said wall-switch box;

electrically actuatable switching means mounted onto said mounting means, connected in circuit with said pair of wires, and operable to cause electrical connection and/or non-connection therebetween in response to electrical actuation signals; *the electrically actuatable switching means including a semiconductor means through which flows at least a part of any current flowing between said pair of wires;* and programmable electronic timer means connected in circuit with said switching means and operable to provide said actuation signals in accordance with said time program; said timer means having: (i) programming control means operative to accept manual programming instructions productive of changing part and/or all of said preset time program, and (ii) display means operative to provide visually discernible indication of the manual programming instructions having been accepted by said manual programming input means; said programming control means being manually accessible from the outside of said face plate, said display means being visually discernible from the outside of said face plate;

whereby, said wall-switch product is capable by way of coupling means mounted in alignment with and coupled through said aperture, of being used with a standard wall-switch face plate having but a single *central* aperture therein while also being capable of energizing said electrical load in accordance with said preset time program even though connected with but a single pair of wires.

17. A power control product adapted to plug into an ordinary electric power receptacle and operable to control the flow of power therefrom to a load, *the load being of a type adapted to function properly when powered directly with a voltage of frequency and magnitude equal to that of the power line voltage usually present at an ordinary electric utility power line,* said product comprising:

plug means adapted for plug-in connection with said receptacle;

receptacle means operative to accept plug-in connection of said load;

power control means connected in circuit with said plug means and receptacle means, and operable to control the flow of power to said load, said power control means comprising a programmable timer means and requiring for its proper operation a supply of DC voltage that is independent of the presence of voltage at said electric receptacle; and voltage supply means operable to supply said DC voltage.

21. An electronic wall-switch product adapted: (i) to be mounted at a standard wall-switch box in lieu of an ordinary mechanical wall-switch having two electrical connection terminals; said wall-switch box having: (i) a cover plate with an aperture therein; and (ii) by means aligned with and protruding through said aperture to be used for controlling the flow of power to a load from an electric utility power line; said electronic wall-switch product comprising:

electrically actuatable load circuit switching means connectable with said power line and operable to control said flow of power in response to actuation signals; *the electrically actuatable load circuit switching means being characterized by including a semiconductor through which flows at least a part of any current flow through the load;* electronic control means connected in circuit with said switching means and operable to provide said actuation signal; said control means comprising programmable timer means and requiring for its proper operation a supply of DC voltage that is independent of any voltage present on said power line; and voltage supply means operative to supply said DC voltage;

whereby said wall-switch product is capable of controlling the flow of power to said load even though being connected with but said two electrical connection terminals.

24. An electronic wall-switch product adapted: (i) to be mounted at a standard electrical wall-switch box in lieu of an ordinary mechanical wall-switch, said wall-switch box having a pair of wires coming thereinto, (ii) to be used and mounted in combination with a standard face plate having an aperture, and (iii) to be used for energizing an electrical load in accordance with a preset time program; said product, after having been mounted at said wall-switch box, comprising:

a pair of conductor means connected with said pair of wires;

electrically actuatable load circuit switching means connected in circuit with said pair of conductor means and operable to cause electrical connection and/or non-connection therebetween in response to electrical actuation signals; *the electrically actuatable load circuit switching means including a semiconductor through which flows at least a part of any current flowing between said pair of conductor means;* programmable electronic timer circuit means connected with said load circuit switching means and operable to provide said actuation signals thereto in accordance with said preset time program, said timer circuit means being receptive of programming instructions productive of changing all or any part of said preset time program;

programming control means operative to manually receive said programming instructions and to communicate these to said timer circuit means;

visual display means connected with said control means and operative to provide visual indication of programming instructions being or having been received by said control means; and mounting means operative to provide for mounting to said wall-switch box of said conductor means, said load circuit switching means, said timer circuit means, said programming control means, said visual display means, and said standard face plate; said mounting means being operative to dispose said standard face plate in a position between said conductor means and the combination of said programming control means and said visual display means, with said conductor means being located substantially within said wall-switch box and behind said face plate, and with said combination being located outside of said wall-switch box and in front of said face plate;

whereby said wall switch product is capable, by way of coupling means mounted in alignment with said aperture and operative to couple therethrough, of being used with a standard face plate having but a single *central* aperture, while also being capable of energizing an electrical load in accordance with a preset time program, yet being connected with but a single pair of wires.

26. A wall-switch product provided in at least two separate parts, said parts being adapted: (i) for coupling with one another in communicative and mechanical relationship by way of mutually compatible coupling means, (ii) for assembly and mounting at a standard electrical wall-switch box in lieu of an ordinary mechanical wall-switch, said wall-switch box having a pair of wires coming thereinto, (iii) for use and mounting in combination with a standard wall-switch face plate, said face plate having an aperture, (iv) for mounting one on each side of said face plate, with said coupling being accomplished by way of said aperture, and (v) when assembled and mounted at said wall-switch box, to energize and de-energize an electrical load in accordance with a preset program; said two parts being identified as a first part and a second part; said first part: (i) being adapted to be mounted onto and to be located substantially within said wall-switch box, (ii) having connect means adapted for connection with said pair of wires, and (iii) having fastening means by which said face plate can be fastened thereonto; said second part: (i) being adapted to be supported by and to couple with said first part after the face plate has been fastened thereonto, said coupling being accomplished by way of said coupling means which is aligned with and operative to couple through said aperture, and (ii) having program control and display means operative to permit the establishment and corresponding visual affirmation of said preset program;

whereby said wall-switch product is capable of being mounted and used with a face plate having but a single *central* aperture, while at the same time being capable of energizing and de-energizing an electrical load in accordance with a preset program, yet being connected with but a single pair of wires; *the wall-switch product being further characterized by including a semiconductor means through which flows at least a part of any current flowing between said pair of wires.*

*27. An power control product adapted to plug into an ordinary electric power receptacle and operable to control the flow of power therefrom to a load; said product comprising:*

*plug means adapted for plug-in connection with said receptacle;*

*receptacle means operative to accept plug-in connection of said load; the load requiring for its proper operation to be supplied with a voltage of frequency and magnitude equal to that of the power line voltage ordinarily present at an ordinary electric utility power line;*

*power control means connected in circuit with said plug means and said receptacle means, and operable to control the flow of power to said load; said power control means comprising a programmable timer means and requiring for its proper operation a supply of DC voltage that is indepdent of the presence of voltage at said electric power receptacle; and*

*voltage supply means operable to supply said DC voltage.*

*28. An electronic wall-switch product adapted: (i) to be mounted at a standard electrical wall-switch box in lieu of an ordinary mechanical wall-switch, said wall-switch box having a pair of wires coming thereinto, (ii) to be used and mounted in combination with an ordinary wall-switch face*

*plate having a central aperture therein, and (iii) to be used for energizing an electrical load in accordance with a preset time program, said time program being controllably changeable in part and/or in its entirety; said product, after having been mounted at said wall-switch box, comprising:*

*mounting means fastened onto said wall-switch box;*

*electrically actuatable switching means mounted onto said mounting means, connected in circuit with said pair of wires, and operable to cause electrical connection and/or non-connection therebetween in response to electrical actuation signals; the electrically actuatable switching means being characterized by not including said ordinary mechanical wall-switch; and*

*programmable electronic timer means connected in circuit with said switching means and operable to provide said actuation signals in accordance with said time program; said timer means having: (i) programming control means operative to accept programming instructions productive of changing part and/or all of said preset time program, and (ii) display means operative to provided visually discernible indication of the manual programming instructions having been accepted by said manual programming input means; said programming control means being manually accessible from the outside of said face plate;*

*whereby, said wall-switch product is capable by way of coupling means mounted in alignment with and coupled through said aperture, of being used with a standard wall-switch face plate having but a single central aperture therein while also being capable of energizing said electrical load in accordance with said preset time program even though connected with but a single pair of wires.*

*29. An electronic wall-switch product adapted: (i) to be mounted at a standard electrical wall-switch box in lieu of an ordinary mechanical wall-switch, said wall-switch box having a pair of wires coming thereinto, (ii) to be used and mounted in combination with an ordinary wall-switch face plate having a central aperture therein, and (iii) to be used for energizing an electrical load in accordance with a preset time program, said time program being controllably changeable in part and/or in its entirety; said product, after having been mounted at said wall-switch box, comprising:*

*mounting means fastened onto said wall-switch box;*

*electrically actuatable switching means mounted onto said mounting means, connected in circuit with said pair of wires, and operable to cause electrical connection and/or non-connection therebetween in response to electrical actuation signals; the electrically actuatable switching means including a triac through which flows at least a part of any current flowing through the electrical load; and*

*programmable electronic timer means connected in circuit with said switching means and operable to provide said actuation signals in accordance with said time program; said timer means having: (i) programming control means operative to accept programming instructions productive of changing part and/or all of said preset time program, and (ii) display means operative to provide visually discernible indication of the manual programming instructions having been accepted by said manual programming input means; said programming control means being manually accessible from the outside of said face plate;*

*whereby, said wall-switch product is capable by way of coupling means mounted in alignment with and coupled through said aperture, of being used with a standard wall-switch face plate having but a single central aperture therein while also being capable of energizing said electrical load in accordance with said preset time program even though connected with but a single pair of wires.*

*30. An electronic wall-switch product adapted: (i) to be mounted at a standard electrical wall-switch box in lieu of an ordinary mechanical wall-switch, said wall-switch box having a pair of wires coming thereinto, (ii) to be used and mounted in combination with an ordinary wall-switch face plate having a central aperture therein, and (iii) to be used for energizing an electrical load in accordance with a preset time program, said time program being controllably changeable in part and/or in its entirety; said product, after having been mounted at said wall-switch box, comprising:*

*mounting means fastening onto said wall-switch box;*

*electrically actuatable switching means mounted onto said mounting means, connected in circuit with said pair of wires, and operable to cause electrical connection and/or non-connection therebetween in response to electrical actuation signals; and*

*programmable electronic timer means connected in circuit with said switching means and operable to provide said actuation signals in accordance with said time program; said timer means having: (i) programming control means operative to accept programming instructions productive of changing part and/or all of said preset time program, and (ii) display means operative to provide visually discernible indication of the manual programming instructions having been accepted by said manual programming input means; said programming control means being manually accessible from the outside of said face plate;*

*whereby, said wall-switch product is capable by way of coupling means mounted in alignment with and coupled through said aperture, of being used with a standard wall-switch face plate having but a single central aperture therein while also being capable of energizing said electrical load in accordance with said preset time program even though connected with but a single pair of wires; the coupling means including a pair of conductors extending through the aperture.*

*31. An electronic wall-switch product adapted: (i) to be mounted at a standard wall-switch box in lieu of an ordinary mechanical wall-switch having two electrical connection terminals; said wall-switch box having: (i) a cover plate with an aperture therein; and (ii) by means aligned with and protruding through said aperture to be used for controlling the flow of power to a load from an electric utility power line; said electronic wall-switch product comprising:*

*electrically actuatable load circuit switching means connectable with said power line and operable to control said flow of power in response to actuation signals;*

*electronic control means connected in circuit with said switching means and operable to provide said actuation signal; said control means comprising programmable timer means and requiring for its proper operation a supply of DC voltage that is independent of any voltage present on said power line; and*

*voltage supply means operative to supply said DC voltage;*

*whereby said wall-switch product is capable of controlling the flow of power to said load even though being connected with but said two electrical connection terminals;*

*said electronic wall-switch product being additionally characterized by also comprising electrical conductors protruding through said aperture.*

*32. An electronic wall-switch product adapted: (i) to be mounted at a standard wall-switch box in lieu of an ordinary mechanical wall-switch having two electrical connection terminals; said wall-switch having: (i) a cover plate with an aperture therein; and (ii) by means aligned with and protruding through said aperture to be used for controlling the flow of power to a load from an electric utility power line; said electronic wall-switch product comprising:*

*electrically actuatable load circuit switching means connectable with said power line and operable to control said flow of power in response to actuation signals;*

*electronic control means connected in circuit with said switching means and operable to provide said actuation signals; said control means comprising programmable timer means and requiring for its proper operation a supply of DC voltage that is independent of any voltage present on said power line; and*

*voltage supply means operative to supply said DC voltage;*

*whereby said wall-switch product is capable of controlling the flow of power to said load even though being connected with but said two electrical connection terminals;*

*the wall-switch product being further characterized by not including said ordinary mechanical wall-switch.*

* * * * *